(12) United States Patent
Jeong et al.

(10) Patent No.: US 8,073,208 B2
(45) Date of Patent: Dec. 6, 2011

(54) METHOD AND SYSTEM FOR CLASSIFYING SCENE FOR EACH PERSON IN VIDEO

(75) Inventors: Jin Guk Jeong, Yongin-si (KR); Ji Yeun Kim, Seoul (KR); Sang Kyun Kim, Yongin-si (KR); San Ko, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1126 days.

(21) Appl. No.: 11/882,733

(22) Filed: Aug. 3, 2007

(65) Prior Publication Data

US 2008/0166027 A1 Jul. 10, 2008

(30) Foreign Application Priority Data

Jan. 4, 2007 (KR) .................. 10-2007-0000957

(51) Int. Cl.
*G06K 9/00* (2006.01)
(52) U.S. Cl. ......... 382/118; 382/170; 382/171; 382/190
(58) Field of Classification Search .................. 382/118
See application file for complete search history.

(56) References Cited

U.S. PATENT DOCUMENTS

| 7,555,149 B2 * | 6/2009 | Peker et al. .................. 382/118 |
| 2006/0120609 A1 * | 6/2006 | Ivanov et al. ................. 382/224 |

OTHER PUBLICATIONS

Chaisorn et al: "A multi-modal approach to story segmentation for news video", Internel and web information system, pp. 187-208, 2003.*

* cited by examiner

*Primary Examiner* — Samir Ahmed
*Assistant Examiner* — Ruiping Li
(74) *Attorney, Agent, or Firm* — Staas & Halsey LLP

(57) ABSTRACT

A method of classifying a scene for each person in a video, the method including: detecting a face within input video frames; detecting a shot change of the input video frames; extracting a person representation frame in the shot; performing a person clustering in the extracted person representation frame based on time information; detecting a scene change by separating a person portion from a background based on face extraction information, and comparing the person portion and the background; and merging similar clusters from the extracted person representation frame and performing a scene clustering for each person.

19 Claims, 7 Drawing Sheets
(2 of 7 Drawing Sheet(s) Filed in Color)

METHOD AND SYSTEM FOR CLASSIFYING SCENE FOR EACH PERSON IN VIDEO

CROSS-REFERENCE TO RELATED APPLICATION

This application claims the benefit of Korean Patent Application No. 10-2007-0000957, filed on Jan. 4, 2007, in the Korean Intellectual Property Office, the disclosure of which is incorporated herein by reference.

BACKGROUND OF THE INVENTION

1. Field of the Invention

The present invention relates to a method and system for classifying a scene for each person in a video, and more particularly, to a method and system for classifying a scene for each person in a video based on person information and background information in video data.

2. Description of Related Art

Generally, a scene is a unit between when video contents are changed. In a conventional art, scenes are classified by using low level information such as color information or edge information.

Specifically, shots are clustered using low level information such as color information extracted in all frames, and a scene segmentation is detected in a conventional automatic scene segmentation algorithm. However, when a person in a video moves or a camera moves, low level information changes. Accordingly, a degree of accuracy decreases.

Also, persons in a video are clustered using face information, and thus the persons are classified in a conventional person classification method. However, face information changes depending on poses, lighting, and the like, which causes a low accuracy.

Accordingly, a method and system for classifying a scene for each person in a video is required.

BRIEF SUMMARY

An aspect of the present invention provides a method and system for classifying a scene for each person in a video which may provide a story overview for each person by classifying a person by a scene unit by using temporal information in video data.

An aspect of the present invention also provides a method and system for classifying a scene for each person in a video which may improve an accuracy of a scene segmentation detection by separating a person portion and a background in video data and using information about the person portion and the background together.

According to an aspect of the present invention, there is provided a method of classifying a scene for each person in a video, the method including: detecting a face within input video frames; detecting a shot change of the input video frames; extracting a person representation frame in the shot; performing a person clustering in the extracted person representation frame based on time information; detecting a scene change by separating a person portion from a background based on face extraction information, and comparing the person portion and the background; and merging similar clusters from the extracted person representation frame and performing a scene clustering for each person.

According to another aspect of the present invention, there is provided a system for classifying a scene for each person in a video, the system including: a face detection unit detecting a face within input video frames; a shot change detection unit detecting a shot change of the input video frames; a person representation frame extraction unit extracting a person representation frame in the shot; a person clustering unit performing a person clustering in the extracted person representation frame based on time information; a scene change detection unit detecting a scene change by separating a person portion from a background based on face extraction information and comparing the person portion and the background; and a scene clustering unit merging similar clusters from the extracted person representation frame and performing a scene clustering for each person.

Additional aspects and/or advantages of the invention will be set forth in part in the description which follows and, in part, will be apparent from the description, or may be learned by practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
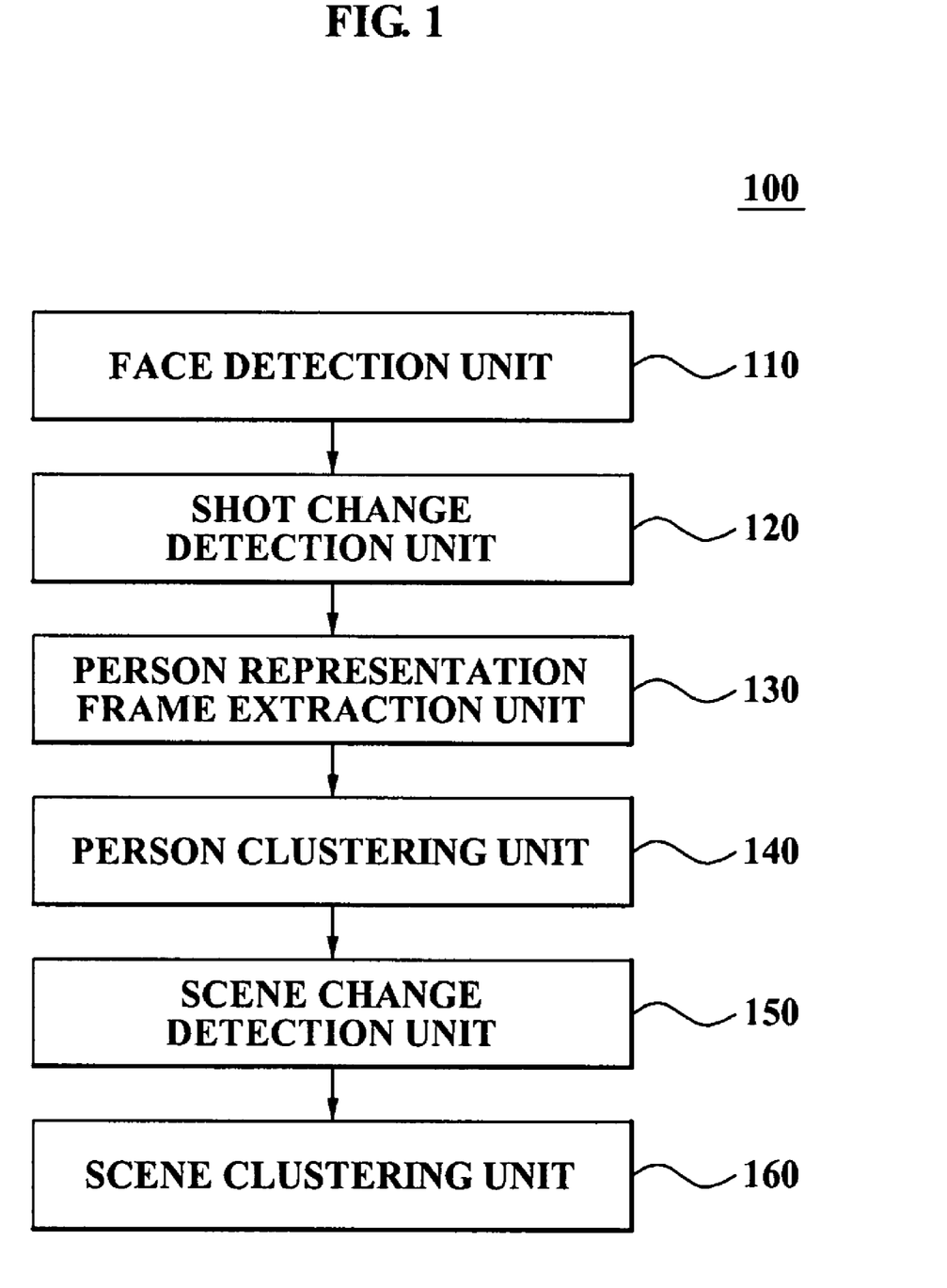
FIG. 1 is a block diagram illustrating a configuration of a system for classifying a scene for each person in a video according to an embodiment of the present invention.

FIG. 1 is a block diagram illustrating a configuration of a system for classifying a scene for each person in a video according to an embodiment of the present invention.

Referring to FIG. 1, the system for classifying a scene for each person in a video 100 includes a face detection unit 110, a shot change detection unit 120, a person representation frame extraction unit 130, a person clustering unit 140, a scene change detection unit 150, and a scene clustering unit 160.

The face detection unit 110 detects a face of input video frames. Specifically, the face detection unit 110 analyzes the input video frames, and detects the face of the input video frames.

The shot change detection unit 120 detects a shot change within the input video frames. Specifically, the shot change detection unit 120 detects the shot change of the input video frames to segment the input video frames into a shot which is a basic unit of the video.

The person representation frame extraction unit 130 extracts a person representation frame in the shot. Using all person frames for a person clustering is inefficient. Accordingly, the person representation frame extraction unit 130 extracts a frame which is closest to a center frame having a greatest similarity in each cluster as the person representation frame, after performing a clustering of frames including a face in the shot. Specifically, the person representation frame extraction unit 130 extracts the frame one by one in all clusters and may set the frame as the person representation frame in the shot, since at least one person may be included in the shot.

Figure 2:
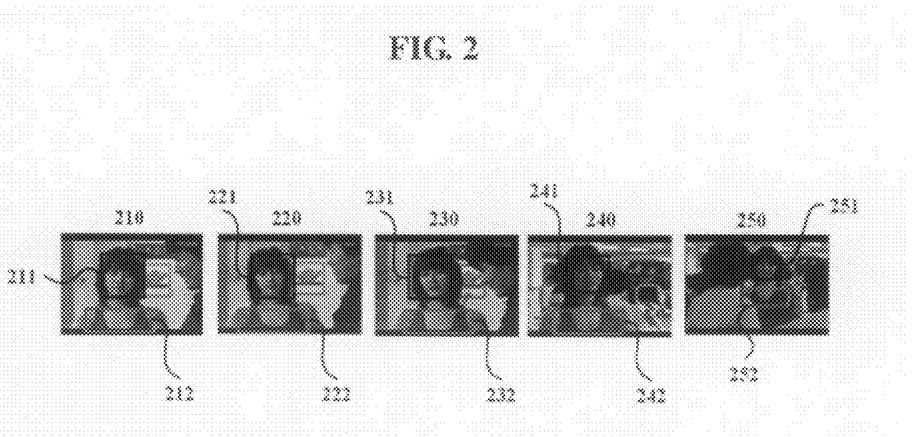
FIG. 2 is a diagram illustrating an example of clothes information and face information detected in a same time window according to an embodiment of the present invention.

The person clustering unit 140 performs the person clustering in the extracted person representation frame based on time information. When simply performing a clustering based on all person representation frames, an algorithm for various poses or lightings may not be strict. Accordingly, the person clustering unit 140 performs the person clustering by using the time information to start clustering based on various forms of each person. Specifically, as illustrated in FIG. 2, a single person generally wears same clothes within a similar time period in same video data, and such clothes information has a clearer difference than face information. Accordingly, the person clustering unit 140 obtains various forms of the single person by using the clothes information.

FIG. 2 is a diagram illustrating an example of clothes information and face information detected in a same time window according to an embodiment of the present invention.

A location and size of a face 211, 221, 231, 241, and 251, automatically detected in a person representation frame 210, 220, 230, 240, and 250 in a shot, and a location and size of clothes 212, 222, 232, 242, and 252, extracted in the person representation frame 210, 220, 230, 240, and 250, are illustrated in FIG. 2. The size of clothes is determined in proportion to a size of a key person in the person representation frame 210, 220, 230, 240, and 250 in the shot.

The person clustering unit 140 extracts clothes information from current cluster information, a current person representation frame, and a comparison person representation frame, i.e. a person representation frame to be compared. The person clustering unit 140 compares the current person representation frame and the comparison person representation frame, and determines whether the current person representation frame is similar to the comparison person representation frame as a result of the comparing. The person clustering unit 140 extends a time window when the current person representation frame is similar to the comparison person representation frame, and includes the person representation frame which has been currently compared in the current cluster information. The person clustering unit 140 sets a subsequent person representation frame as another comparison person representation frame on the time window. Also, the person clustering unit 140 determines whether the current person representation frame and the comparison person representation frame are at an end of the time window, when the current person representation frame is different from the comparison person representation frame. The person clustering unit 140 sets the subsequent person representation frame in the time window as the other comparison person representation frame, when the current person representation frame and the comparison person representation frame are not at the end of the time window.

A scene change detection unit 150 detects a scene change by separating a person portion from a background based on face extraction information and comparing the person portion and the background. Specifically, the scene change detection unit 150 may approximately extract a person by using the face extraction information, and thus may detect the scene change by the separating and the comparing after the person is approximately extracted.

The scene change detection unit 150 receives current scene information, a current shot representation frame, and a comparison shot representation frame, and extracts background information from the current shot representation frame and the comparison shot representation frame. The scene change detection unit 150 compares the current shot representation frame and the comparison shot representation frame, and determines whether the current shot representation frame is similar to the comparison shot representation frame. The scene change detection unit 150 extends the time window when the current shot representation frame is similar to the comparison shot representation frame, and marks that the comparing of the current shot representation frame is completed. The scene change detection unit 150 assigns the comparison shot representation frame to the current shot representation frame, and assigns a subsequent shot representation frame in the time window to the comparison shot representation frame. The scene change detection unit 150 marks that the comparing of the current shot representation frame is completed, when the current shot representation frame is different from the comparison shot representation frame, and determines whether comparing all frames in the time window is completed. The scene change detection unit 150 assigns a subsequent shot representation frame where the comparing is incomplete to the current shot representation frame, and assigns the subsequent shot representation frame to the comparison shot representation frame, when the comparing is incomplete.

A scene clustering unit 160 merges similar clusters from the extracted person representation frame and performs a scene clustering for each person. Specifically, the scene clustering unit 160 may perform the scene clustering for each person by comparing the person representation frame in the shot and merging the similar clusters according to the comparison, as illustrated in FIG. 3.

The scene clustering unit 160 receives time information-based clusters, and selects two clusters having a minimum difference value. The scene clustering unit 160 compares the minimum difference value and a threshold value, and merges the two clusters when the minimum difference value is less than the threshold value. The scene clustering detection unit 160 connects scenes including a person frame in a same cluster, when the minimum difference value is equal to or greater than the threshold value. A scene clustering method for each person is described in greater detail with reference to FIG. 3.

Figure 3:
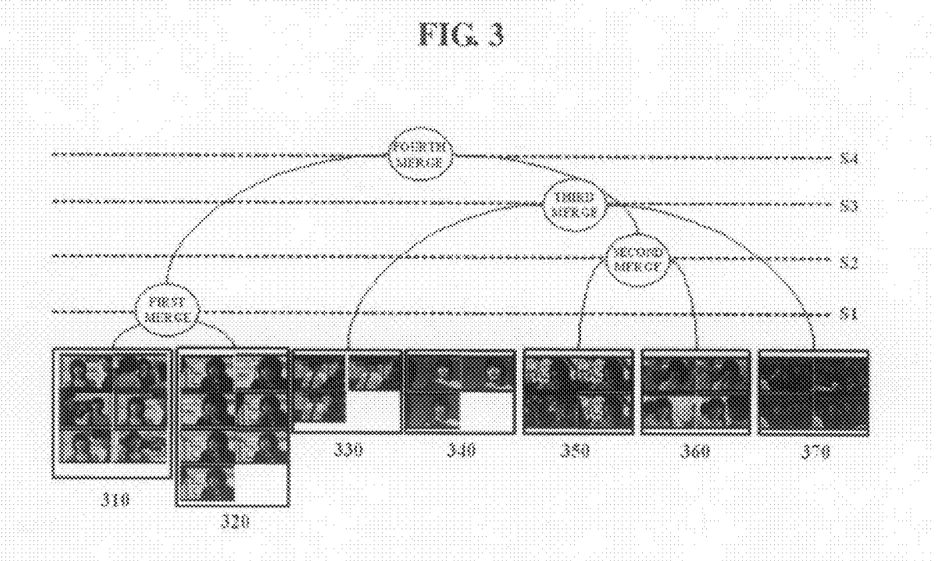
FIG. 3 is a diagram illustrating an example of performing a clustering for each person according to an embodiment of the present invention.

FIG. 3 is a diagram illustrating an example of performing a clustering for each person according to an embodiment of the present invention.

In operation S1, a scene clustering unit 160 compares a first person representation frame 310 and a second person representation frame 320, and performs a first merge of similar clusters based on a result of the comparison. In operation S2, the scene clustering unit 160 compares a fifth person representation frame 350 and a sixth person representation frame 360, and performs a second merge of similar clusters based on a result of the comparison. In operation S3, the scene clustering unit 160 compares a third person representation frame 330 and a seventh person representation frame 370, and performs a third merge of similar clusters based on a result of the comparison. In operation S4, the scene clustering unit 160 compares the first merge and the second merge, and performs a fourth merge of similar clusters based on a result of the comparison.

Figure 4:
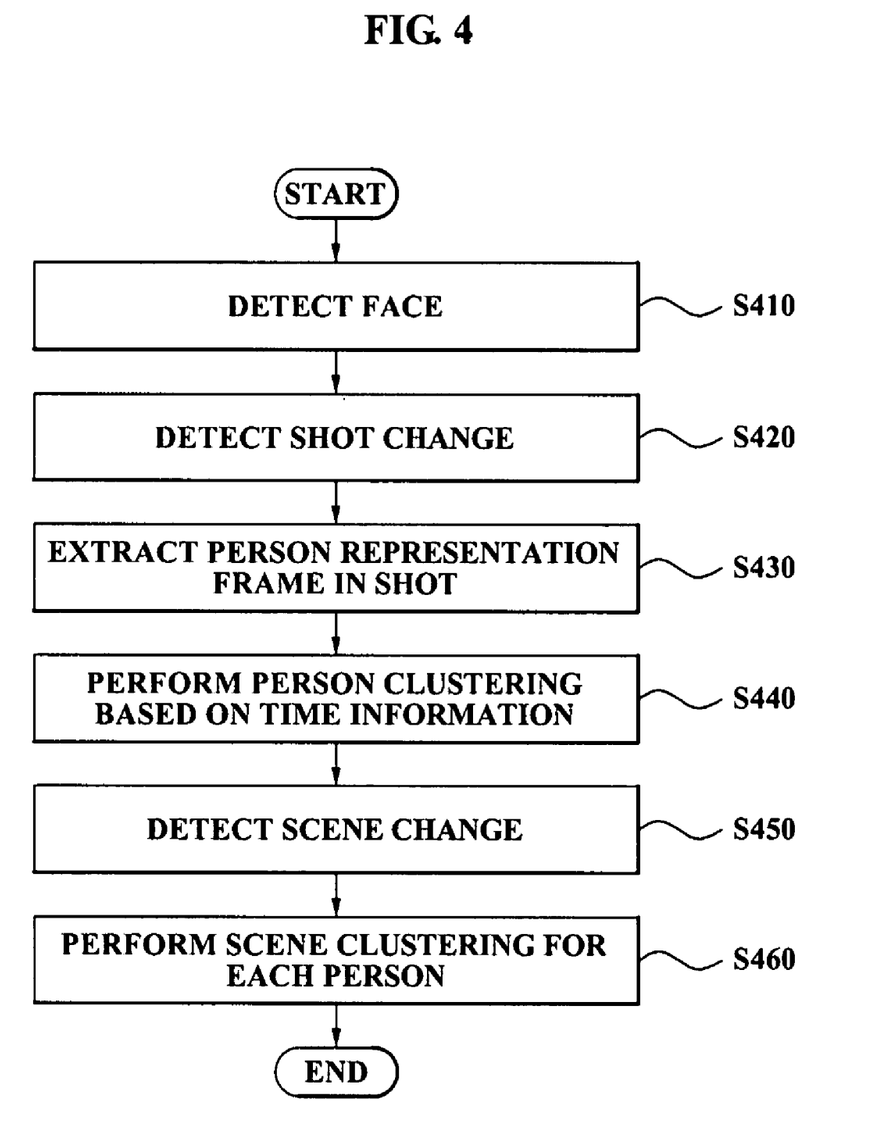
FIG. 4 is a flowchart illustrating a method of classifying a scene for each person in a video according to another embodiment of the present invention.

FIG. 4 is a flowchart illustrating a method of classifying a scene for each person in a video according to another embodiment of the present invention.

Referring to FIG. 4, in operation S410, a system for classifying a scene for each person in a video detects a face within input video frames. Specifically, the system for classifying a scene for each person in a video analyzes the input video frames via a face detector and thereby may detect the face within the input video frames.

In operation S420, the system for classifying a scene for each person in a video detects a shot change within the input video frames. Specifically, the system for classifying a scene for each person in a video detects the shot change within the input video frames to segment the input video frames into a shot which is a basic unit of the video.

In operation S430, the system for classifying a scene for each person in a video extracts a person representation frame in the shot. Since using all person frames for a person clustering is inefficient, the system for classifying a scene for each person in a video extracts a frame which is closest to a center in each cluster as the person representation frame, after performing a clustering of frames including a face in the shot. Specifically, the system for classifying a scene for each person in a video extracts the frame one by one in all frames and may set the frame as the person representation frame in the shot, since at least one person may be included in the shot.

In operation S440, the system for classifying a scene for each person in a video performs the person clustering in the extracted person representation frame based on time information. When simply clustering based on all person representation frames, an algorithm for various poses or lightings may not be strict. Accordingly, the system for classifying a scene for each person in a video performs the person clustering by using the time information to start clustering based on various forms of each person. Specifically, a single person generally wears the same clothes within a similar time period in the same video data, and such clothes information has a clearer difference than face information. Accordingly, the system for classifying a scene for each person in a video obtains various forms of the single person by using the clothes information. An operation of a time information-based person clustering is described in greater detail with reference to FIG. 5.

Figure 5:
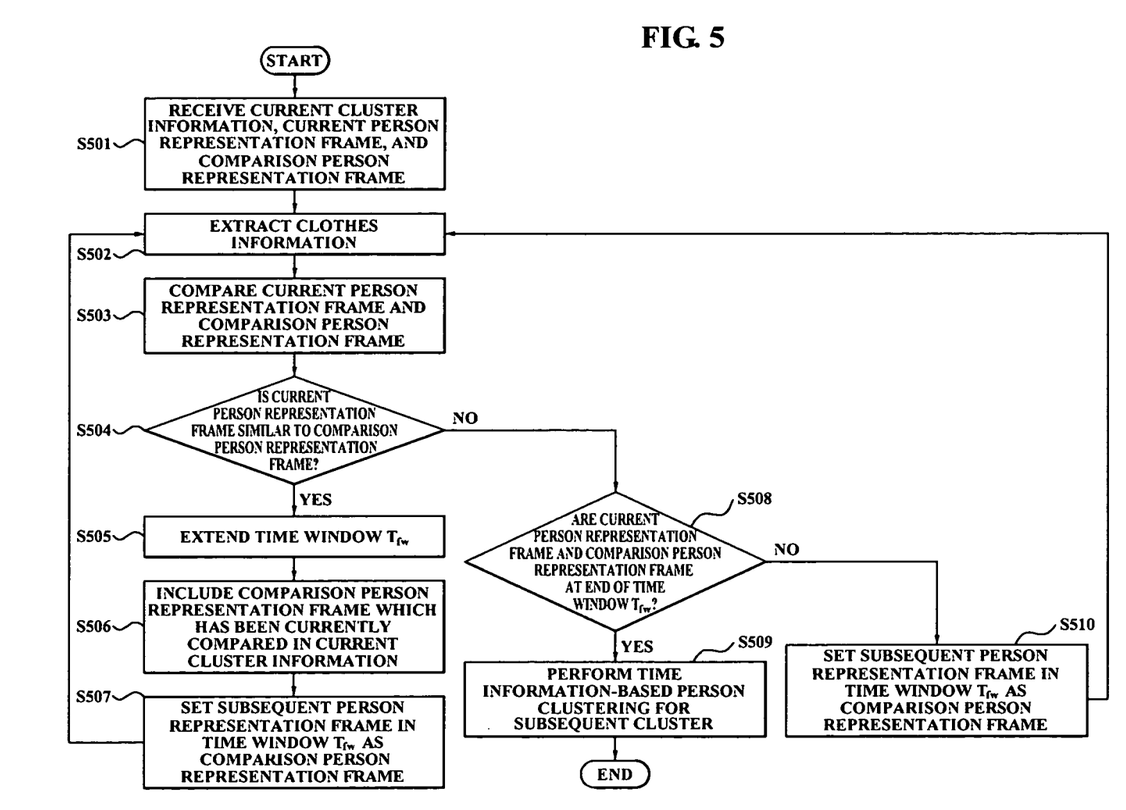
FIG. 5 is a flowchart illustrating an operation of a time information-based person clustering illustrated in FIG. 4 according to another embodiment of the present invention.

FIG. 5 is a flowchart illustrating an operation of a time information-based person clustering illustrated in FIG. 4 according to another embodiment of the present invention.

Referring to FIG. 5, in operation S501, the system for classifying a scene for each person in a video receives current cluster information, a current person representation frame, and a comparison person representation frame. The comparison person representation frame is a person representation frame to be compared.

In operation S502, the system for classifying a scene for each person in a video extracts clothes information of each of the current person representation frame and the comparison person representation frame. Specifically, the system for classifying a scene for each person in a video may extract the clothes information by referring to the location and size of the face from the face information as illustrated in FIG. 2 to reduce a time to extract clothes information.

In operation S503, the system for classifying a scene for each person in a video compares the current person representation frame and the comparison person representation frame. Specifically, the system for classifying a scene for each person in a video adds a comparison value of color information corresponding to the clothes information and a weight of a comparison value corresponding to the face information, when comparing.

In operation S504, the system for classifying a scene for each person in a video determines whether the current person representation frame is similar to the comparison person representation frame, as a result of the comparing.

In operation S505, when the current person representation frame is similar to the comparison person representation frame, the system for classifying a scene for each person in a video extends a time window $T_{fw}$. Specifically, when the current person representation frame is similar to the comparison person representation frame, the system for classifying a scene for each person in a video resets the time window $T_{fw}$ from a present point in time, since a same person exists up to the present point in time.

In operation S506, the system for classifying a scene for each person in a video includes the comparison person representation frame which has been currently compared in the current cluster information. Specifically, the system for classifying a scene for each person in a video includes the comparison person representation frame, which has been compared with the current person representation frame, in the current cluster information.

In operation S507, the system for classifying a scene for each person in a video sets a subsequent person representation frame in the time window $T_{fw}$ as other comparison person representation frame, and performs operation S502. Specifically, the system for classifying a scene for each person in a video continues to compare using the subsequent person representation frame in the time window $T_{fw}$.

In operation S508, when the current person representation frame is different from the comparison person representation frame, the system for classifying a scene for each person in a video determines whether the current person representation frame and the comparison person representation frame are at an end of the time window $T_{fw}$. Specifically, when the current person representation frame is different from the comparison person representation frame, the system for classifying a scene for each person in a video determines whether the all frames in the time window $T_{fw}$ are compared by using a result of the determining whether the current person representation frame and the comparison person representation frame are at the end of the time window $T_{fw}$.

In operation S509, when the current person representation frame and the comparison person representation frame are at the end of the time window $T_{fw}$, the system for classifying a scene for each person in a video moves to a subsequent cluster and performs a time information-based person clustering for the subsequent cluster, since all person representation frames corresponding to a current cluster are extracted.

In operation S510, when the current person representation frame and the comparison person representation frame are not at the end of the time window $T_{fw}$, the system for classifying a scene for each person in a video sets the subsequent person representation frame as the comparison person representation frame, and performs operation S502, since the all person representation frames corresponding to the current cluster are not detected.

In operation S450, the system for classifying a scene for each person in a video detects a scene change by separating a person portion from a background based on face extraction information and comparing the person portion and the background. Specifically, the system for classifying a scene for each person in a video may approximately extract a person by using the face extraction information, and thus may detect the scene change by the separating and the comparing after the person is approximately extracted. A scene change detection operation is described in greater detail with reference to FIG. 6.

Figure 6:
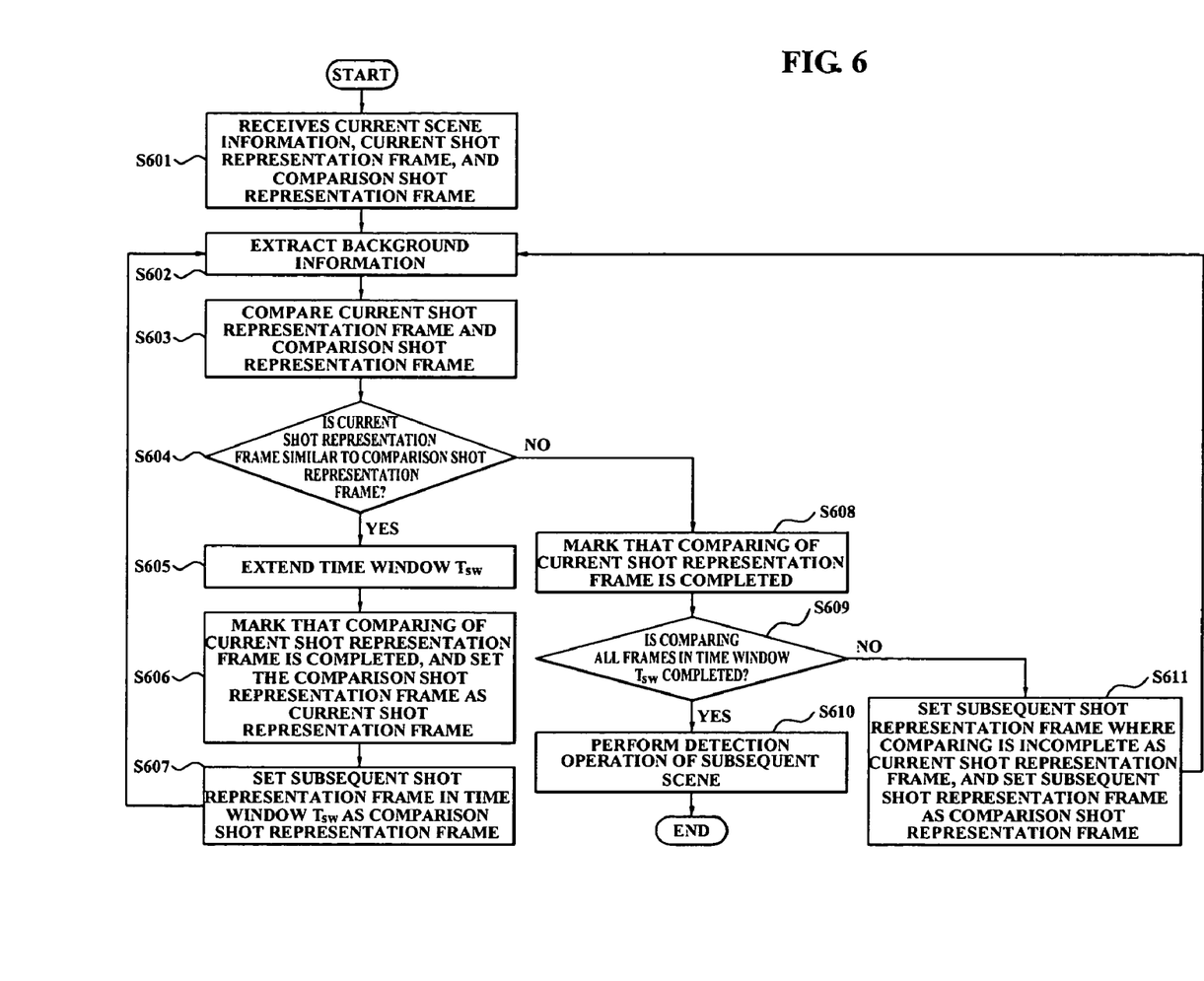
FIG. 6 is a flowchart illustrating an operation of a scene change detection illustrated in FIG. 4 according to another embodiment of the present invention.

FIG. 6 is a flowchart illustrating an operation of a scene change detection illustrated in FIG. 4 according to another embodiment of the present invention.

Referring to FIG. 6, in operation S601, the system for classifying a scene for each person in a video receives current scene information, a current shot representation frame $P_f$ and a comparison shot representation frame $C_f$.

In operation S602, the system for classifying a scene for each person in a video extracts background information of the current shot representation frame $P_f$ and the comparison shot representation frame $C_f$. The background information is information about a pixel of another location excluding a face location and a clothes location.

In operation S603, the system for classifying a scene for each person in a video compares the current shot representation frame $P_f$ and the comparison shot representation frame $C_f$. Specifically, the system for classifying a scene for each person in a video adds the comparison value of the color information corresponding to the clothes information and the weight of the comparison value corresponding to the face information, when comparing. Also, when comparing the background information, a normalized color histogram, and a hue, saturation, value (HSV) are used.

In operation S604, the system for classifying a scene for each person in a video determines whether the current shot representation frame $P_f$ is similar to the comparison shot representation frame $C_f$, as a result of the comparing.

In operation S605, when the current shot representation frame $P_f$ is similar to the comparison shot representation frame $C_f$, the system for classifying a scene for each person in a video extends a time window $T_{sw}$. Specifically, the system for classifying a scene for each person in a video resets the time window $T_{sw}$ to extend a scene again, since a same scene is continued up to a point in time when the current shot representation frame $P_f$ is similar to the comparison shot representation frame $C_f$.

In operation S606, the system for classifying a scene for each person in a video marks that the comparing of the current shot representation frame $P_f$ is completed, and sets the comparison shot representation frame $C_f$ as the current shot representation frame $P_f$.

In operation S607, the system for classifying a scene for each person in a video sets a subsequent shot representation frame in the time window $T_{sw}$ as a comparison shot representation frame (*$C_f$?), and performs operation S602. Specifically, the system for classifying a scene for each person in a video continues to compare using the subsequent shot representation frame in the time window $T_{sw}$.

In operation S608, when the current shot representation frame $P_f$ is different from the comparison shot representation frame $C_f$, the system for classifying a scene for each person in a video marks that the comparing of the current shot representation frame $P_f$ is completed.

In operation S609, the system for classifying a scene for each person in a video determines whether comparing all frames in the time window $T_{sw}$ is completed.

In operation S610, when the comparing all frames in the time window $T_{sw}$ is completed, the system for classifying a scene for each person in a video determines a shot, which is examined last and determined to be a similar shot, as a last shot of a current scene, since all shots corresponding to the current scene are detected. Also, the system for classifying a scene for each person in a video performs a detection operation of a subsequent scene.

In operation S611, when the comparing is incomplete, the system for classifying a scene for each person in a video sets a subsequent shot representation frame where the comparing is incomplete as the current shot representation frame $P_f$, and sets the subsequent shot representation frame as the comparison shot representation frame $C_f$. Also, the system for classifying a scene for each person in a video performs operation S602.

In operation S460, the system for classifying a scene for each person in a video merges similar clusters from the extracted person representation frame and performs the scene clustering for each person. Specifically, the system for classifying a scene for each person in a video may perform the scene clustering by comparing and merging as illustrated in FIG. 3. An operation of a scene clustering for each person is described in greater detail with reference to FIG. 7.

Figure 7:
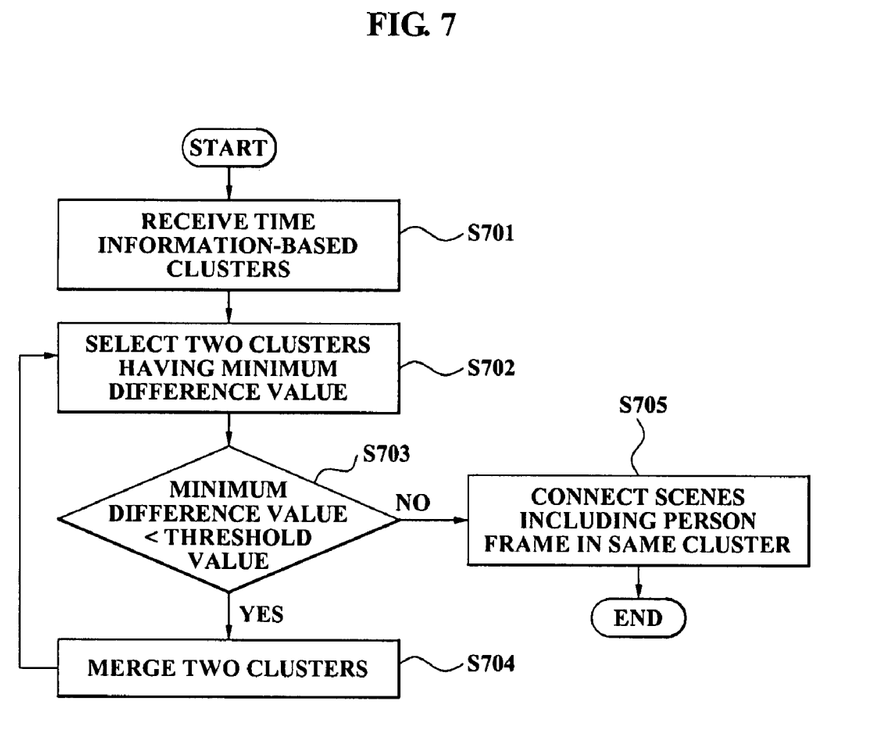
FIG. 7 is a flowchart illustrating an operation of a scene clustering for each person according to another embodiment of the present invention.

FIG. 7 is a flowchart illustrating an operation of a scene clustering for each person according to another embodiment of the present invention.

Referring to FIG. 7, in operation S701, the system for classifying a scene for each person in a video receives time information-based clusters.

In operation S702, the system for classifying a scene for each person in a video selects two clusters having a minimum difference value from difference values from among all clusters. Specifically, the difference values of all clusters may be compared using an average value of each cluster. Also, the minimum difference value may be used after comparing all objects of a corresponding cluster and all objects of a comparison cluster.

In operation S703, the system for classifying a scene for each person in a video compares the minimum difference value and a threshold value and determines whether the minimum difference value is less than the threshold value.

In operation S704, when the minimum difference value is less than the threshold value, the system for classifying a scene for each person in a video merges the two clusters, as illustrated in FIG. 3, since the two clusters include a similar person. Also, the system for classifying a scene for each person in a video performs operation S702.

In operation S705, when the minimum difference value is equal to or greater than the threshold value, the system for classifying a scene for each person in a video connects scenes including a person frame in a same cluster. Specifically, the system for classifying a scene for each person in a video determines that all clustering are completed when the minimum difference value is equal to or greater than the threshold value. Also, when connecting the scenes including a same person, the operation of a scene clustering for each person is completed. Each scene may be included in many clusters since various persons may exist in a single scene.

The method and system for classifying a scene for each person in a video according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

A method and system for classifying a scene for each person in a video according to the above-described embodiments of the present invention may provide a story overview for each person by classifying a person by a scene unit by using temporal information in video data.

Also, a method and system for classifying a scene for each person in a video according to the above-described embodiments of the present invention may improve an accuracy of a scene segmentation detection by separating a person portion and a background in video data and using information about the person portion and the background together.

Also, a method and system for classifying a scene for each person in a video according to the above-described embodiments of the present invention may replay for each person in video data, and thereby may enable a user to selectively view a scene including a person that the user likes.

Also, a method and system for classifying a scene for each person in a video according to the above-described embodiments of the present invention may classify a person by a scene unit, which is a story unit in video data, and thereby may improve a scene classification accuracy and enable a scene-based navigation.

Also, a method and system for classifying a scene for each person in a video according to the above-described embodiments of the present invention may perform a video data analysis more easily by improving a scene classification accuracy in video data.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of classifying a scene for each person in a video, the method comprising:
    detecting a face within input video frames, using a computer;
    segmenting the input video frames into a plurality of shots, wherein each shot comprises a segment of input video frames;
    detecting a shot change of the input video frames from the segmented input video frames;
    extracting a person representation frame from a shot;
    performing a person clustering of the extracted person representation frames from the shot using information corresponding to the shot within a time window;
    detecting a scene change, after a person portion is separated from the input video frames corresponding to the plurality of shots, by extracting background information from a background portion from the input video frames corresponding to the plurality of shots, and by comparing the extracted background information from an input video frame with at least one other input video frame;
    merging similar clusters from the clustered persons from the extracted person representation frames from the plurality of shots; and
    connecting scenes including a common person from the merged similar clusters for each person in a plurality of scenes,
    wherein the performing of the person clustering comprises:
        receiving current cluster information, a current person representation frame, and a comparison person representation frame to be compared;
        comparing the current person representation frame and the comparison person representation frame to be compared;
        determining whether the current person representation frame is similar to the comparison person representation frame to be compared, and as a result of the comparing;
        extending the time window when the current person representation frame is similar to the comparison person representation frame to be compared;
        including the comparison person representation frame which has been compared to the current person representation frame in the current cluster information; and
        setting a subsequent person representation frame as the new comparison person representation frame to be compared in the time window.

2. The method of claim 1, wherein the performing of the person clustering further comprises:
    extracting clothes information of each of the current person representation frame and the comparison person representation frame to be compared,
    wherein the comparing of the current person representation frame and the comparison person representation frame to be compared includes comparing the extracted clothes information of the current person representation frame with the extracted clothes information of the comparison person representation frame to be compared.

3. The method of claim 1, further comprising:
    determining whether the current person representation frame and the comparison person representation frame to be compared are at an end of the time window, when the current person representation frame is different from the comparison person representation frame to be compared;
    moving to a subsequent cluster from the extracted person representation frames when the current person representation frame and the comparison person representation frame to be compared are at the end of the time window; and
    setting the subsequent person representation frame in the time window as the new comparison person representation frame to be compared with the current person representation frame, when the current person representation frame and the comparison person representation frame to be compared are not at the end of the time window.

4. The method of claim 1, wherein the detecting of the scene change comprises:
    receiving current scene information, a current shot representation frame, and a comparison shot representation frame;
    extracting background information from the current shot representation frame and the comparison shot representation frame;

comparing the current shot representation frame and the comparison shot representation frame;

determining whether the current shot representation frame is similar to the comparison shot representation frame, and based on a result of the comparison;

extending a scene time window for a scene when the current shot representation frame is similar to the comparison shot representation frame;

marking that the comparing of the current shot representation frame is completed, and setting the comparison shot representation frame as the new current shot representation frame; and setting a subsequent shot representation frame in the scene time window as the new comparison shot representation frame.

5. The method of claim 4, further comprising:

marking that the comparing of the current shot representation frame is completed, when the current shot representation frame is different from the comparison shot representation frame;

determining whether comparing all frames in the scene time window is completed; and setting a subsequent shot representation frame where the comparing is incomplete as the new current shot representation frame, and setting a shot representation frame subsequent to the new current shot representation frame as the new comparison shot representation frame, when the comparing is incomplete.

6. The method of claim 1, wherein the merging similar clusters from the clustered persons from the extracted person representation frames from the plurality of shots comprises:

receiving clusters from the clustered persons from the extracted person representation frames from the plurality of shots in the time window;

selecting two clusters having a minimum difference value;

comparing the minimum difference value and a threshold value; and merging the two clusters when the minimum difference value is less than the threshold value.

7. The method of claim 6, wherein the connecting scenes including a common person from the merged similar clusters for each person in a plurality of scenes comprises: connecting the scenes including the common person from the merged similar clusters when the minimum difference value is equal to or greater than the threshold value.

8. A non-transitory computer-readable recording medium storing a program for implementing a method of classifying a scene for each person in a video, the method comprising:

detecting a face within input video frames;

segmenting the input video frames into a plurality of shots, wherein each shot comprises a segment of input video frames;

detecting a shot change of the input video frames from the segmented input video frames;

extracting a person representation frame from a shot;

performing a person clustering of the extracted person representation frame from the shot using information corresponding to the shot within a time window, wherein the performing of the person clustering comprises:

receiving current cluster information, a current person representation frame, and a comparison person representation frame to be compared;

comparing the current person representation frame and the comparison person representation frame to be compared;

determining whether the current person representation frame is similar to the comparison person representation frame to be compared, and as a result of the comparing;

extending the time window when the current person representation frame is similar to the comparison person representation frame to be compared, including the comparison person representation frame which has been compared to the current person representation frame in the current cluster information; and setting a subsequent person representation frame as the new comparison person representation frame to be compared in the time window;

detecting a scene change, after a person portion is separated from the input video frames corresponding to the plurality of shots, by extracting background information from a background portion from the input video frames corresponding to the plurality of shots, and by comparing the extracted background information from an input video frame with at least one other input video frame;

merging similar clusters from the clustered persons from the extracted person representation frames from the plurality of shots; and connecting scenes including a common person from the merged similar clusters for each person in a plurality of scenes.

9. A system for classifying a scene for each person in a video, the system comprising:

a face detection unit to detect a face within input video frames, using a computer;

a shot change detection unit to segment the input video frames into a plurality of shots, wherein each shot comprises a segment of input video frames, and to detect a shot change of the input video frames;

a person representation frame extraction unit to extract a person representation frame from a shot;

a person clustering unit to perform a person clustering of the extracted person representation frame from the shot using information corresponding to the shot within a time window, wherein the person clustering unit extracts information from current cluster information, a current person representation frame, and a comparison person representation frame to be compared, compares the current person representation frame and the comparison person representation frame to be compared, determines whether the current person representation frame is similar to the comparison person representation frame to be compared, and as a result of the comparing, extends the time window when the current person representation frame is similar to the comparison person representation frame to be compared, includes the comparison person representation frame which has been currently compared to the current person representation frame in the current cluster information, and sets a subsequent person representation frame as the new comparison person representation frame to be compared in the time window;

a scene change detection unit to detect a scene change, after a person portion is separated from the input video frames corresponding to the plurality of shots, by extracting background information from a background portion from the input video frames corresponding to the plurality of shots, and by comparing extracted background information from an input video frame with at least one other input video frame; and a scene clustering unit to merge similar clusters from the clustered persons from the extracted person representation frames and to connect scenes including a common person from the merged similar clusters for each person in a plurality of scenes.

10. The system of claim 9, wherein the information to be extracted from current cluster information by the person clustering unit includes clothes information, and wherein the comparing of the current person representation frame and the comparison person representation frame to be compared by the person clustering unit includes comparing the extracted clothes information of the current person representation frame with the extracted clothes information of the comparison person representation frame to be compared.

11. The system of claim 9, wherein the person clustering unit determines whether the current person representation frame and the comparison person representation frame to be compared are at an end of the time window, when the current person representation frame is different from the comparison person representation frame to be compared, and sets the subsequent person representation frame in the time window as the new comparison person representation frame to be compared, when the current person representation frame and the comparison person representation frame to be compared are not at the end of the time window.

12. The system of claim 9, wherein the scene change detection unit receives current scene information, a current shot representation frame, and a comparison shot representation frame, extracts background information from the current shot representation frame and the comparison shot representation frame, compares the current shot representation frame and the comparison shot representation frame, determines whether the current shot representation frame is similar to the comparison shot representation frame, extends a scene time window for a scene when the current shot representation frame is similar to the comparison shot representation frame, marks that the comparing of the current shot representation frame is completed, assigns the comparison shot representation frame to the new current shot representation frame, and assigns a subsequent shot representation frame in the scene time window to the new comparison shot representation frame.

13. The system of claim 12, wherein the scene change detection unit marks that the comparing of the current shot representation frame is completed, when the current shot representation frame is different from the comparison shot representation frame, determines whether comparing all frames in the scene time window is completed, and assigns a subsequent shot representation frame when the comparing is incomplete to the new current shot representation frame, and assigns a shot representation frame subsequent to the new current shot representation frame as the new comparison shot representation frame, when the comparing is incomplete.

14. The system of claim 9, wherein the scene clustering detection unit receives clusters from the clustered persons from the extracted person representation frames from the plurality of shots in the time window, selects two clusters having a minimum difference value, compares the minimum difference value and a threshold value, and merges the two clusters when the minimum difference value is less than the threshold value.

15. The system of claim 14, wherein the scene clustering detection unit connects scenes including the common person from the merged similar clusters for each person in the plurality of scenes, when the minimum difference value is equal to or greater than the threshold value.

16. The method of claim 2, wherein the extracting clothes information uses a location and size of the detected face in the current person representation frame and the comparison person representation frame to reduce a time to extract clothes information.

17. The method of claim 2, wherein the comparing the current person representation frame and the comparison representation frame comprises:

comparing a value of color information corresponding to the extracted clothes information from the current person representation frame and the comparison person representation frame; and assigning a weighted value corresponding to face information from the detected face in the current person representation frame and the comparison person representation frame.

18. The method of claim 1, wherein the background portion information excludes a face location and a clothes location.

19. The method of claim 6, wherein the minimum difference value of the two clusters is determined using the average value of each cluster.

* * * * *

UNITED STATES PATENT AND TRADEMARK OFFICE
CERTIFICATE OF CORRECTION

| | | |
|---|---|---|
| PATENT NO. | : 8,073,208 B2 | Page 1 of 1 |
| APPLICATION NO. | : 11/882733 | |
| DATED | : December 6, 2011 | |
| INVENTOR(S) | : Jin Guk Jeong et al. | |

It is certified that error appears in the above-identified patent and that said Letters Patent is hereby corrected as shown below:

On the Title Page, Item (56), (Other Publications), Line 2, Delete "Internel" and insert -- Internal --, therefor.

Column 12, Line 7, In Claim 8, Delete "compared," and insert -- compared; --, therefor.

Signed and Sealed this
Twenty-second Day of May, 2012

David J. Kappos
*Director of the United States Patent and Trademark Office*